United States Patent
Moore et al.

(10) Patent No.: US 7,066,020 B1
(45) Date of Patent: Jun. 27, 2006

(54) PERSONAL SEVERE WEATHER WARNING MICROCHIP AND PRESSURE SENSOR

(76) Inventors: Ronald R. Moore, 1393 Antioch Rd., Cave City, AR (US) 72521; Michael D. Collins, 1700 Sanders Rd., Charlotte, AR (US) 72522

( * ) Notice: Subject to any disclaimer, the term of this patent is extended or adjusted under 35 U.S.C. 154(b) by 0 days.

(21) Appl. No.: 10/850,283

(22) Filed: May 20, 2004

Related U.S. Application Data

(60) Provisional application No. 60/473,068, filed on May 23, 2003.

(51) Int. Cl.
*G01W 1/00* (2006.01)

(52) U.S. Cl. .................................................. 73/170.16

(58) Field of Classification Search ............. 73/170.16, 73/170.17; 340/601
See application file for complete search history.

(56) References Cited

U.S. PATENT DOCUMENTS

| | | | | |
|---|---|---|---|---|
| 6,034,608 | A * | 3/2000 | Frank et al. | 340/601 |
| 6,097,296 | A * | 8/2000 | Garza et al. | 340/601 |
| 6,154,143 | A * | 11/2000 | Robinson | 340/601 |
| 6,169,487 | B1 * | 1/2001 | Davis | 340/601 |

* cited by examiner

*Primary Examiner*—Edward Lefkowitz
*Assistant Examiner*—Jermaine Jenkins
(74) *Attorney, Agent, or Firm*—Head, Johnson & Kachigian

(57) ABSTRACT

A small, portable device for detecting impending severe weather. The device measures change in barometric pressure and sounds a buzzer when changes in pressure indicate that severe weather, including tornadoes, are likely to occur. Homes and businesses are therefore freed from reliance on television or radio for such information.

4 Claims, 2 Drawing Sheets

PERSONAL SEVERE WEATHER WARNING MICROCHIP AND PRESSURE SENSOR

CROSS REFERENCE TO RELATED APPLICATIONS

This application is based on Provisional Patent Application No. 60/473,068 filed on May 23, 2003.

BACKGROUND OF THE INVENTION

1. Field of the Invention

The present invention relates to an apparatus and method for providing a severe weather and tornado warning system that is relatively small and portable (smoke alarm size). Specifically, the present invention utilizes a barometric pressure sensor that automatically sets itself depending on the altitude of the unit and notifies the user of drastic changes in barometric pressure indicative of impending severe weather, including severe thunderstorms and tornadoes.

2. Background

Severe weather, including tornadoes, costs the lives of dozens of people every year. Due to the unpredictability of tornadoes, meteorological predictions of their occurrence and location is limited. In addition, if a person does not have ready access to a television or radio, they may not have the opportunity to receive what limited forecasts are available. Residences, businesses and persons conducting recreational activity are all often away from television or radio programming for extended lengths of time. This leaves them vulnerable to severe weather that they are unaware of until it is too late.

The most reliable indicator of impending severe weather is the local barometric pressure. One of the reasons for the shortcomings of television and radio weather forecasts is that they must rely on radar images at a weather station. These are often poor indicators of local changes in barometric pressure.

Relatively small pressure sensing devices have been developed in recent years. However, safe barometric pressure readings vary greatly depending on altitude.

It is therefore desirable to provide a personal device for alerting the operator of impending severe weather and/or tornadoes.

SUMMARY OF THE INVENTION

The present invention provides a small device designed to warn the operator of impending severe weather. Severe weather may be a thunderstorm, a tornado or other dangerous weather condition. It is more accurate than television or radio meteorological forecasts because it uses the local barometric pressure being experienced by the operator.

An electric pressure measuring device is incorporated into the invention. When it records a drop in barometric pressure equal to that of a preselected value, it sounds an alarm or buzzer to warn the operator of the drastic change in barometric pressure. In this manner, the operator is alerted to the impending foul weather.

One of the advantages of the present invention is its ability to calibrate its barometric pressure sensing circuit. When the device is turned on, it measures the barometric pressure at that time. This value is used to compare subsequent reading. The device measures changes in barometric pressure over time.

One typical setting for the device is to sound an alarm when barometric pressure falls by a tenth of pressure over a half hour period. It may also be set to sound an alarm when a much slower drop in barometric pressure brings the pressure value to 29.4 or less. Such changes in barometric pressure are highly indicative of severe weather from which an operator would likely seek shelter.

The device is small and compact and hangs on a wall such as a smoke detector.

It is therefore an object of the present invention to provide a method and apparatus for lightweight warning of severe weather.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, the severe storm detector has a barometric pressure sensor, a buzzer or alarm, an on/off switch, a battery and a simple program while measuring change in barometric pressure over time. The program may be software, firmware or permanently designed into the hardware.

Figure 1:
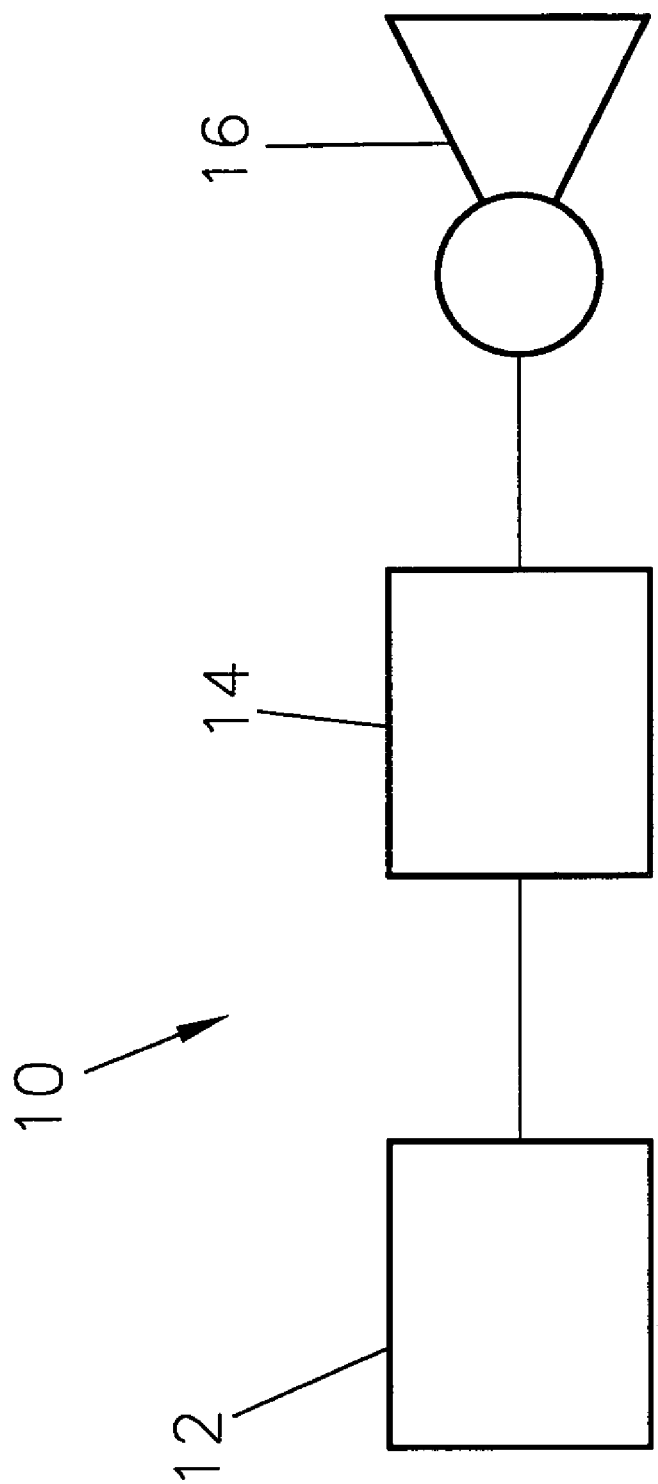
FIG. 1 is a diagrammatic illustration of the present invention.

FIG. 1 shows a diagram of the present invention. Barometer 12 reads the ambient pressure and sends an electric signal to microprocessor 14. Barometer 12 is an absolute barometer and many different types are commonly available. Any absolute barometer will suffice as long as it is capable of transmitting an electric signal to microprocessor 14 indicative of the current barometric pressure.

Microprocessor 14 may be powered by either a battery or by connection to a typical wall outlet. When the device is initially turned on, the microprocessor begins recording the barometric pressure, taking a reading every three minutes. The barometric pressure read at the moment the device is turned on is stored in memory. Subsequent measurements of the pressure are compared to this start-up pressure as well as to immediately previous pressure reading. After these comparisons are made, the older measurement is erased to save storage space. The start-up pressure is held in memory as is the most recent pressure reading until it has been compared to a subsequent reading. After a reading is compared to a subsequent pressure reading, that measurement is erased. Measurements are typically taken every three minutes. However, it may be desirable to alter the microprocessor such that it takes a pressure reading every minute, every five minutes or at any other desired interval. The microprocessor performs some relatively simple calculations. Each time a measurement is taken it is compared to the original, start-up pressure. When the difference between the current pressure and the start-up pressure exceeds a certain value, typically 7/10" the microprocessor 14 activates alarm 16 and sounds an alarm. A drastic change in pressure such as this is often indicative of severe weather and alarm 16 alerts persons nearby to that severe weather. Microprocessor 14 also measures the difference between the most recently taken measurement and the measurement reading immediately previous to that one. If the difference between these two readings is greater than a preprogrammed amount, typically 1/100", the microprocessor 14 activates buzzer 16 so as to sound another alarm. It is desirable to have these two alarms, known as a "level" alarm and "rate" alarm, to have different sounds. It is also desirable to have the microprocessor activate buzzer 16 to create another distinct alarm when the device is initially turned on.

In the present invention, pressure is referred to in terms of inches, specifically inches of mercury. Those skilled in the art will appreciate that small, absolute barometers for use in small devices such as that disclosed by the present invention utilize a variety of techniques to measure pressure, typically do not actually use mercury. Those skilled in the art of barometry will appreciate that approximately 29.92 inches of mercury equals one atmosphere and that one inch mercury equals approximately 25.4 torr.

Buzzer 16 may be any of a variety of types known in the art. Preferably, the buzzer capable of emitting at least 1 tone of a high pitch as loudly as possible is preferred. The entire device is approximately five inches by five inches and has a buzzer similar to those used by smoke detectors.

Figure 2:
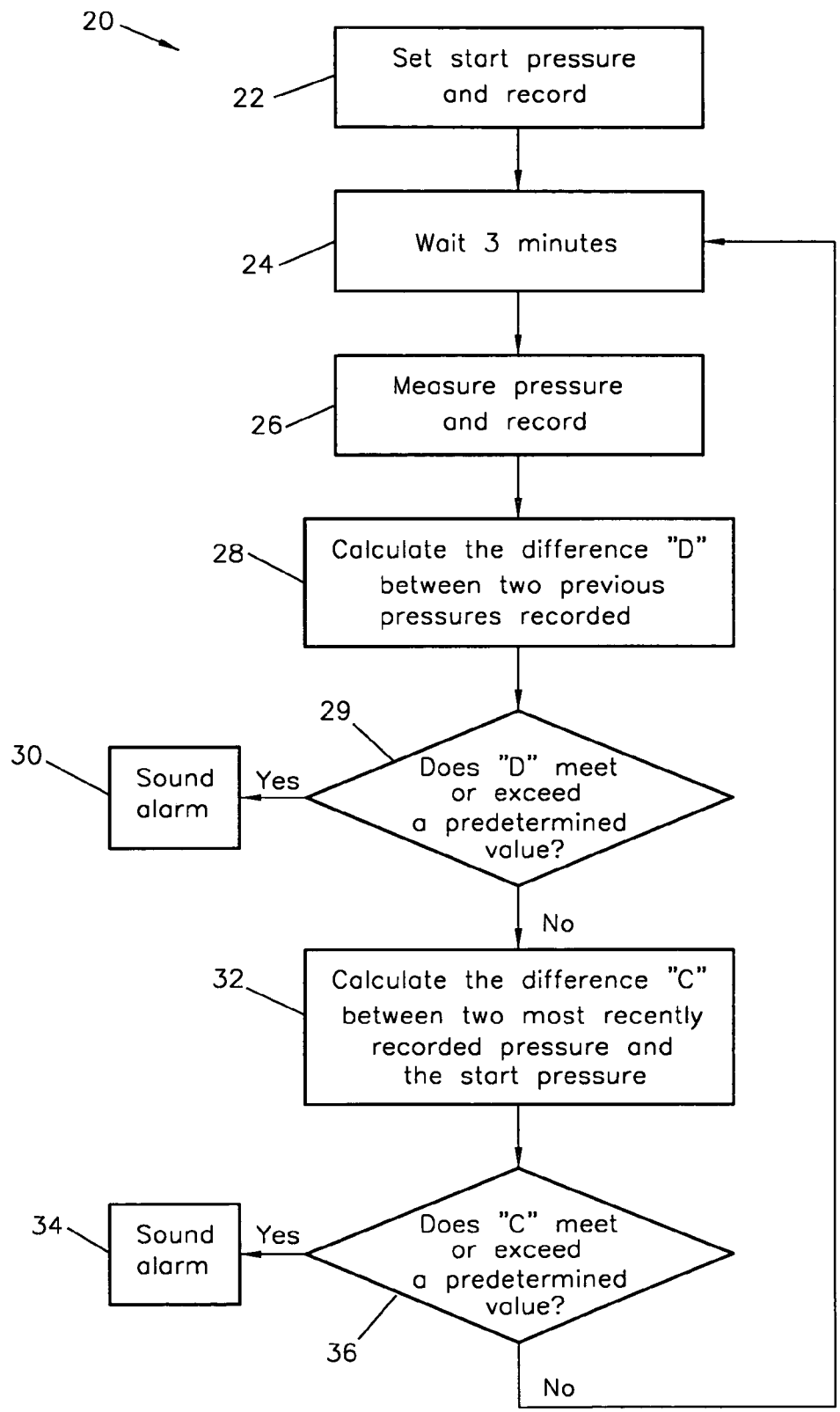
FIG. 2 is a flowchart of the present invention.

FIG. 2 shows a flowchart 20 showing the algorithm used by the circuitry of the microprocessor. As stated previously, the microprocessor may be programmed utilizing software, firmware or the algorithm may be designed using the hardware and circuitry itself.

Flowchart 20 begins with initial step 22 in which the ambient pressure is recorded when the device is first turned on. It is preferred to record an ambient pressure when the device is initially started rather than have a preprogrammed initial pressure. In this manner, the device may be used at any altitude. The initial start pressure is recorded. Once this pressure is recorded, it is desirable to have an alarm sound to indicate that the device is functioning properly.

The next step 24 is to wait three minutes. Those skilled in the art will appreciate that this time may be readily altered. It may be desirable to wait only one minute or to wait ten or more minutes. Next, the microprocessor records the pressure measured by the barometer. This measurement is temporarily stored in memory. In the next step 28 the difference between the most recently recorded pressure taken in step 24 and the previously recorded pressure is determined. In the microprocessor's first cycle, the difference in pressure calculated is that between the start pressure and the second pressure measurement recorded. The start pressure is never erased. However, all other pressure measurements are erased after they have been compared to the immediately subsequent pressure reading. Once the change in pressure D has been recorded in step 28, it is compared to a predetermined value in step 29. Typically a change in pressure of 1/10" over a ½ hour period is indicative of severe weather. A predetermined value which D is compared to in step 29 is based upon such a change. Therefore, when pressure is measured every three minutes, the predetermined value would preferably be 1/100". Those skilled in the art will appreciate that this calculation detects a rapid rate of change in pressure. When such a rapid rate change occurs, when D meets or exceeds the predetermined, preprogrammed value, the microprocessor signals the buzzer to sound the rate alarm 30.

In the next step 32, the difference C between the most recently recorded pressure and the initial start up pressure is calculated. Those skilled in the art will appreciate that this calculation does not necessarily measure a rate of change in pressure but rather calculates an overall change in pressure from the initial start pressure. In step 36 the value C is compared against a second predetermined value. A typical predetermined value is 7/10". If the value C meets or exceeds this predetermined value, the microprocessor activates the buzzer so that the level alarm will sound. However, if the values D and C do not meet or exceed the predetermined, preprogrammed values set in the microprocessor, the entire process is repeated. The microprocessor waits three minutes and then takes another measurement. This process is repeated so long as power is supplied to the device.

Optionally, the device may also include a preprogrammed default start temperature in the microprocessor. If the recorded ambient start pressure is especially high or especially low, the microprocessor may be programmed to utilize a default pressure instead of the recorded start pressure. Preferably, the rate alarm and the level alarm have distinct sounds, but this is not necessary. The distinction may lie in the pitch or duration of the alarm.

One of the advantages of the present invention is that it sets its standard, or base pressure when turned on. Further, it may also be reset in order to change the standard or base pressure. This allows the device to readily be used at any given altitude or location.

Whereas, the present invention has been described in relation to the drawings attached hereto, it should be understood that other and further modifications, apart from those shown or suggested herein, may be made within the spirit and scope of this invention.

What is claimed is:

1. A device for detecting impending severe weather comprising:
    an absolute barometric pressure sensor having an electronic output signal;
    a microprocessor engaged with the absolute barometric sensor so as to receive electronic signals from it;
    an alarm connected to the microprocessor such that the microprocessor may activate the alarm by sending it an electronic signal;
    wherein the microprocessor receives pressure measurement by means of an electronic signal from the absolute barometric pressure sensor and calculates the difference between the pressure measurements and an initial pressure reading and compares the value obtained to a predetermined value and activates the alarm when the calculated value exceeds the predetermined value; and
    wherein the microprocessor calculates the difference between the measurements of two consecutive barometric pressure sensor readings and compares that value to a preprogrammed value and when the calculated value exceeds the preprogrammed value the microprocessor activates the alarm.

2. The device of claim 1 wherein the first predetermined value is 0.7 inches.

3. The device of claim 1 wherein the second predetermined value is 0.1 inches.

4. The device of claim 1 further comprising a battery.

* * * * *